United States Patent Office 3,350,393
Patented Oct. 31, 1967

3,350,393
PRODUCTION OF PURE CAPROLACTAM
Norbert Petri and Hugo Strehler, Ludwigshafen (Rhine), Germany, assignors to Badische Anilin- & Soda-Fabrik Aktiengesellschaft, Ludwigshafen (Rhine), Rhineland, Pfalz, Germany
No Drawing. Filed Oct. 19, 1965, Ser. No. 498,136
Claims priority, application Germany, Oct. 31, 1964, B 79,160
11 Claims. (Cl. 260—239.3)

ABSTRACT OF THE DISCLOSURE

In a process for coverting cyclohexanone oxime into caprolactam by contacting the oxime with a solid catalyst at 210°–450° C. and condensing caprolactam from the effluent reaction gas, the steps of quenching the reaction gas with liquid caprolactam having a temperature at least 10° C. below the temperature of the gas mixture leaving the reaction zone and condensing caprolactam therefrom in a condensation zone by direct cooling with a low boiling solvent, e.g. water, supplied at the top of the condensation zone. Caprolactam is the monomer used for producing polycaprolactam (nylon 6).

---

It is known that caprolactam formed by rearrangement of cyclohexanone oxime in contact with solid catalysts in the gas phase may be condensed in coolers through which flows air or water which has been preheated to temperatures of 50° to 70° C. In this way, the gas mixture, which leaves the reactor at temperatures of up to 450° C., only gradually reaches the condensation temperature of the lactam upon entering the cooler, so that in the portion of the cooler in which condensation begins, but in which the wall of the cooler is not yet covered by a descending film of caprolactam, thermal decomposition of the caprolactam takes place to a certain extent. Apart from the consequent decrease in yield, purification of the caprolactam is made more difficult by the decomposition products formed. Moreover, particularly when an inert carrier gas is used in the rearrangement reaction, only an incomplete condensation of the caprolactam is achieved so that it may be necessary to attach to the first cooler a second cooler charged with cold water or brine. In this prior art type of condensation, fairly large amounts of byproducts formed in the rearrrangement always remain in the lactam from the first cooling stage, which lower the quality of the crude lactam and make its purification more difficult. The proportion of byproducts which are more volatile than caprolactam, for example unsaturated nitriles, and water is naturally greater in the lactam in any second cooling stage which may be necessary, so that purification is made even more difficult.

It is an object of this invention to provide a new process for the recovery of caprolactam from hot vapors containing caprolactam by which the amount of byproducts formed during condensation is considerably reduced and consequently the quality of caprolactam is improved. Another object of the invention is to provide a process for the recovery of caprolactam from hot vapors containing caprolactam which enables condensation to be carried out in a single operation. These and other objects and advantages will be better understood from the following detailed description.

We have now found that in the production of caprolactam by catalytic rearrangement of cyclohexanone oxime in contact with solid catalysts at elevated temperature in the presence or absence of inert gases, a purer caprolactam which is therefore more easily purified is obtained by quenching the gas mixture leaving the reaction chamber with liquid caprolactam and carrying out the subsequent condensation of caprolactam in a column provided with baffles, the top of the column being charged with a low boiling point liquid, particularly water.

An advantage of this process is that when the catalyst is used in fluidized condition, removal of dust from the gas mixture by means of a cyclone before leaving the reaction chamber is sufficient because any fine dust which has not been separated in the cyclone remains in the liquid lactam used for quenching where it gives no trouble, whereas when condensation is carried out merely by means of coolers, an additional removal of fine dust is necessary to prevent deposits of dust and stoppages in the coolers.

The production of caprolactam by catalytic rearrangement of cyclohexanone oxime in the gas phase is carried under the conventional conditions. Thus the vapor of the oxime or the liquid oxime may be brought into contact with the catalyst which is at a reaction temperature of from about 210° to 450° C. At the same time an inert gas may be passed into the catalyst; steam may be used as the inert gas. The process may moreover be carried out at atomspheric or subatmospheric pressure, for example at 10 to 500 mm. Hg, or at slightly superatmospheric pressure, for example up to 1 atm. gauge. Examples of catalyst which may be used, and which are known from the literature, are various phosphoric acids, heteropolyacids, boric acids or alkali bisulphates or mixtures of such substances, which are usually applied to carriers. For example 40 to 50% of boric acid on aluminum oxide, 15 to 25% of boron oxide on titanium dioxide, 15 to 25% of phosphoric acid on silica gel are suitable. Silica gel, aluminum oxide (which may be calcined) or titanium dioxide have proved to be suitable as carriers. The catalysts may be stationary or fluidized.

In order to carry out the process according to this invention, the gas mixture leaving the reaction chamber is quenched by caprolactam at a temperature of from about 70° to 260° C., preferably from about 180° to 220° C., either by passing the gas mixture into caprolactam kept at the said temperature, for example into the bottom of the column used for condensation, or by spraying caprolactam into the gas mixture. The difference between the temperature of the gaseous caprolactam to be quenched and that of the liquid lactam used for cooling should therefore be at least 10° C., but preferably more than 50° C. It is expedient to use the liquid caprolactam arising from the subsequent condensation column. The liquid lactam may also be sprayed in the form of a jet of liquid or in finely divided form into the gas mixture leaving the reaction chamber. The amount of lactam sprayed in should be at least sufficient to ensure that if the whole of it is vaporized the gas mixture is cooled to the desired temperature. It is advantageous however to use a larger amount of liquid caprolactam, for example 3 to 60 parts by weight, preferably about 10 to 40 parts by weight of lactam for each part by weight of gas mixture to be quenched. After the gas mixture has been quenched it is advantageously passed upwardly into a column provided with baffles for condensation. Packed columns, bubble tray columns and vapor baffle plate columns are examples of columns which may be used. The condensation as well as the rearrangement may be effected at atmospheric, superatmospheric or subatmospheric pressure and in the presence or absence of inert gas. The pressure used in condensation may differ from that used in rearrangement. When quenching is carried out by spraying in or injecting the lactam, the quenched vapor is preferably passed into the bottom or the lower third of the column. Condensation takes place in the column because a temperature gradient is constantly maintained in the column by adding a low boiling point liquid, for example an alkanol having one to four carbon atoms, a dialkyl ketone having three to five carbon atoms, an alkane having five to seven carbon atoms or benzene, but particularly water, i.e. by direct cooling. The amount of low boiling point liquid should be determined in accordance with the heat of vaporization of the liquid used, the amount of vapor supplied and the desired bottoms temperature. For example in the case of water 0.06 to 0.7 part by weight, preferably 0.2 to 0.4 part by weight, is generally used for each part by weight of vapor supplied. The low boiling point liquid not only results in a temperature gradient in the column, but also causes additional purification of the caprolactam, because volatile impurities are entrained by the vapor. The temperature conditions in the column are advantageously adjusted so that the caprolactam flows to the bottom, to which also the liquid lactam formed by quenching is led or in which the quenching is carried out, the volume being kept constant by continuous withdrawal of an appropriate amount thereof.

The proportion of byproducts remaining in the lactam depends on the bottoms temperature and the temperature of the first trays in the column. At the lower temperatures, the proportion of byproducts is greater than at the higher temperatures. It is advantageous to choose a temperature of from 180° to 250° C. at the point at which the quenched vapor is introduced into the column and a temperature of from 150° to 250° C. on the first trays in the column above the said point. The number of theoretical trays in the column should be such that no appreciable amount of lactam are contained in the vapor leaving the top of the column.

The invention is further illustrated by the following examples. The permanganate titration number (PTN) used in the following examples as a characteristic of the degree of purity is defined as follows:

Permanganate titration number, PTN for short, is the amount in milliliters of 10 N potassium permanganate solution used up by a solution of 1000 g. of caprolactam in 2500 g. of 50% aqueous sulphuric acid before the permanganate color is stable for two minutes in a titration carried out at room temperature.

EXAMPLE 1

38.45 kg. of cyclohexanone oxime having a water content of 6% is rearranged to caprolactam in a fluidized-bed reactor 2000 mm. in length and 100 mm. in diameter at a temperature of 356° to 360° C. and a pressure of 280 mm. Hg in the course of 315 minutes in contact with 21.1 kg. of catalyst which is passed by means of air locks through the reaction chamber during the said period. The catalyst consists of aluminum oxide with 45% of boron oxide, has a particle size of 0.2 to 0.5 mm. and is kept in fluidized condition by 1.1 cu. m. (STP) per hour of nitrogen together with the vapors of oxime and lactam. The gas leaving the reaction chamber passes to a cyclone heated to 277° C. to separate dust and is then introduced into the bottoms (consisting of caprolactam which has already been condensed) of an uninsulated vapor baffle plate column having ten trays and having a diameter of 100 mm. The volume of bottoms is kept constant at 45 cc. by an overflow. 6.4 liters of water is added to the top tray of the column during the period of operation to condense caprolactam. The temperatures are as follows:

| | ° C |
|---|---|
| Bottoms | 200 |
| First tray | 190 |
| Third tray | 175 |
| Fifth tray | 95 |
| Eighth tray | 55 |
| Top of column | 55 |

Condensed caprolactam flows away over the bottom trays and through the bottoms, while the remaining gas mixture escapes at the top of the column. 33.54 kg. of crude lactam having an average PTN of 7500 is obtained. Distillation of this lactam at 14 mm. Hg gives only 0.12% by weight of water and byproducts at up to 140° C.

If, for comparison, the above procedure is repeated but condensation is carried out by a prior art method by passing the gas leaving the reaction chamber, for dust separation, through a cyclone heated to 280° C., passing the caprolactam through a ball cooler having a length of 1000 mm. and filled in the lower half by 5 x 5 mm. coils of wire mesh of V2A-steel, through which water heated to 60° C. is flowing, and condensing any residues of lactam from the gas in a subsequent cooler fed with water at 15° C., a crude lactam is obtained having an average PTN of 10,500. Distillation of this lactam at 14 mm. Hg gives 3.4% by weight of water and byproducts at up to 140° C.

EXAMPLE 2

14.21 kg. of cyclohexanone oxime having a water content of 5% is rearranged to caprolactam in the fluidized-bed reactor described in Example 1 at 358° to 360° C. and a pressure of 785 mm. Hg in the course of 125 minutes in contact with 7.4 kg. of catalyst which is passed (by means of air locks) through the chamber in the said time. The catalyst is the same as in Example 1 and is kept in fluidization by 3.36 cu. m. (STP) per hour of nitrogen and the vapors of oxime and lactam. The gas leaving the reaction chamber passes through a cyclone heated to 270° C. to remove dust and is passed into the bottoms (consisting of already condensed crude lactam) of the vapor baffle plate column described in Example 1. The volume of the bottoms is kept at 60 cc. by an overflow. The gas quenched in the bottoms then passes into the column into which 1.2 liters of water is introduced at the uppermost tray during the period of operation to effect condensation of the caprolactam. The temperatures are as follows:

| | ° C. |
|---|---|
| Bottoms | 200 |
| First tray | 195 |
| Third tray | 170 |
| Fifth tray | 86 |
| Eighth tray | 72 |
| Top of the column | 70 |

The condensed caprolactam runs away as described in Examples 1. 12.61 kg. of crude lactam is obtained having an average PTN of 5700. Distillation of this lactam gives only 0.12% by weight of water and byproducts at up to 140° C. at 14 mm. Hg.

If the same procedure be followed, except that the gas leaving the reaction chamber is passed for dust separation through a cyclone heated to 345° C. and the caprolactam is condensed in two coolers, a crude lactam is obtained having an average PTN of 12,300. Distillation of this lactam at 14 mm. Hg gives 3.0% by weight of water and byproducts at up to 140° C.

EXAMPLE 3

15.72 kg. of cyclohexanone oxime having a water content of 4.7% is rearranged to caprolactam in the fluidized-bed reactor described in Example 1 at 360° C. and a pressure of 820 mm. Hg in the course of 117 minutes in contact with 7.1 kg. of catalyst passed during this period through the reaction chamber by means of air locks. The catalyst has the same composition as in Example 1, but the particle size is 0.5 to 1.0 mm.; it is kept fluidized by 5.5 cu. m. (STP) per hour of nitrogen and the oxime and lactam vapors. The gas leaving the reaction chamber passes, for dust separation, through a cyclone heated to 325° C. and is passed into the bottoms consisting of already condensed crude lactam of a column having a length of 1600 mm. and a diameter of 60 mm. which is filled with 8 x 8 mm. coils of V2A-steel wire mesh. The volume of the bottoms is kept at 165 cc. by an overflow. The gas which has been quenched in the bottoms then passes into the column into which 3.8 liters of water is introduced during the operational period at the top of the column to condense the caprolactam. The temperatures are as follows: bottoms 210° C.; beneath the column packing 200° C.; after 150 mm. of column packing 120° C.; after 300 mm. of column packing 83° C.; after 950 mm. 80° C.; at the top of the column 75° C. The condensed caprolactam runs away through the lower part of the column packing and the bottoms. 14.17 kg. of crude lactam is obtained having an average PTN of 6400. Distillation of this lactam at 14 mm. Hg gives 0.36% of water and byproducts at up to 140° C.

EXAMPLE 4

During the course of 141.5 hours, 3072.5 kg. of cyclohexanone oxime having a water content of 5.7% is rearranged to caprolactam in a fluidized-bed reactor 2000 mm. in length and 200 mm. in diameter at 375° C. and a pressure of 350 mm. Hg in contact with 1420 kg. of catalyst which is passed through the reaction chamber during the said period via air locks. The catalyst is the same as in Example 3 and is kept in fluidization by 7 cu. m. (STP) per hour of nitrogen and the oxime and lactam vapor. The gas leaving the reaction chamber passes for dust separation through a cyclone heated to 314° C. and then passes into a quencher in which the gas is quenched by injecting 1.5 cu. m. (STP) per hour of already condensed crude caprolactam at 205° C. which is taken from the bottoms of a bubble tray column used for subsequent condensation of the crude lactam. While the lactam used for quenching flows back into the bottoms, the gas mixture passes above the bottoms and below the first tray into an insulated column having a diameter of 200 mm. and fifteen trays in which the caprolactam is condensed. The volume of the bottoms is kept at 23 liters by an overflow. To condense the caprolactam, 1345 liters of water is added to the top tray of the column during the said period. The temperatures are as follows:

| | ° C. |
|---|---|
| Bottoms | 205 |
| First tray | 202 |
| Third tray | 172 |
| Sixth tray | 65 |
| Twelfth tray | 64 |
| Top of the column | 63 |

The condensed caprolactam flows away as described in Example 1. 2703.3 kg. of crude lactam is obtained having an average PTN of 3500. Distillation of this lactam at 14 mm. Hg gives 0.3% by weight of water and byproducts at up to 140° C.

EXAMPLE 5

18.88 kg. of cyclohexanone oxime having a water content of 5% is rearranged to caprolactam in tre fluidized-bed reactor described in Example 1 at 358° to 360° C. and a pressure of 847 mm. Hg during the course of 160 minutes in contact with 9.4 kg. of catalyst which during the said period is passed through the reaction chamber via air locks. The catalyst consists of aluminum oxide with 40% by weight of boron oxide, has a particle size of 0.5 to 1.0 mm. and is kept in fluidization by means of 5.0 cu. m. (STP) per hour of nitrogen and the vapors of the oxime and lactam. The gas leaving the reaction chamber passes for dust separation through a filter chamber heated to 330° C. in which three tubes of V2A sintered metal having a total filtering surface of 0.71 sq. m. are provided and is then introduced into the bottoms consisting of already condensed crude lactam in the vapor baffle plate column described in Example 1. The volume of the bottoms is kept at 100 cc. by an overflow. The gas which has been quenched in the bottoms is then passed upwardly into the column to which during the operating period 3160 cc. of ethanol is added to the top tray of the column to condense the caprolactam. The temperatures are as follows:

| | ° C. |
|---|---|
| Bottoms | 205 |
| First tray | 140 |
| Third tray | 80 |
| Fifth tray | 57 |
| Eighth tray | 50 |
| Top of the column | 50 |

The condensed caprolactam leaves as described in Example 1. 16.34 kg. of crude lactam is obtained having an average PTN of 7,000. Distillation of this lactam at 14 mm. Hg gives water and byproducts in a total amount of only 0.2% by weight at up to 140° C.

We claim:
1. In a process for the conversion of cyclohexanone oxime into caprolactam by contacting said oxime with a solid catalyst in a reaction zone at a temperature of 210° C. to 450° C. and condensing caprolactam from the gas mixture leaving the reaction zone, the improvement which comprises:
  quenching said gas mixture leaving the reaction zone with liquid caprolactam having a temperature of about 70° C. to 260° C. but at least 10° C. lower than the temperature of said gas mixture leaving the reaction zone; and condensing the caprolactam from said gas mixture in a condensation zone by direct cooling with a low boiling solvent introduced at the top of said condensation zone in an amount sufficient to maintain a temperature gradient over said condensation zone.
2. A process as claimed in claim 1 wherein the low boiling solvent is water.
3. A process as claimed in claim 1 wherein 3 to 60 parts by weight of lactam is used for quenching each part by weight of gas mixture.
4. A process as claimed in claim 2 wherein the amount of water added is 0.06 to 0.7 part by weight for each part by weight of vapor supplied.
5. A process as claimed in claim 1 which the condensation is formed by a column provided with baffles.
6. A process as claimed in claim 1 carried out at a pressure of 10 to 500 mm. Hg.
7. A process as claimed in claim 1 wherein the caprolactam used for quenching has a temperature of about 180° C. to 220° C.
8. A process as claimed in claim 3 wherein the amount of lactam used is 10 to 40 parts by weight.
9. A process as claimed in claim 4 wherein said amount of water is 0.2 to 0.4 part by weight.
10. A process as claimed in claim 5 wherein the quenched vapor is introduced into said column for said condensation at a temperature of 180° C. to 250° C.
11. A process as claimed in claim 10 wherein the temperature at the first tray in the baffled column above the point of introduction of the quenched vapor is about 150° C. to 250° C.

References Cited

UNITED STATES PATENTS 3,154,539  10/1964  Irnich _____ 260—239.3
3,210,338  10/1965  Huber et al. _____ 260—239.3

WALTER A. MODANCE, *Primary Examiner.*
R. T. BOND, *Assistant Examiner.*